US006693667B1

(12) United States Patent
Doron (10) Patent No.: US 6,693,667 B1
(45) Date of Patent: Feb. 17, 2004

(54) DIGITAL CAMERA WITH OPTICAL VIEWFINDER AND METHOD OF USING SAME TO VISUALIZE OPTICAL AND DIGITAL ZOOM EFFECTS

(75) Inventor: Amir Doron, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/239,899

(22) Filed: Jan. 29, 1999

Related U.S. Application Data (63) Continuation-in-part of application No. 09/053,819, filed on Mar. 31, 1998.

(51) Int. Cl.[7] .............................................. H04N 5/262
(52) U.S. Cl. .............................. 348/240.99; 348/240.1; 348/341
(58) Field of Search ..................... 348/240.99, 240.1, 348/240.2, 240.3, 333.01, 333.05, 333.06, 333.08, 333.09, 333.11, 333.13, 207.2, 341; 396/377, 287, 429, 85

(56) References Cited

U.S. PATENT DOCUMENTS

| 4,876,590 A | * | 10/1989 | Parulski ...................... 348/281 |
| 5,420,632 A | * | 5/1995 | Yamagiwa ............... 348/240.3 |
| 5,477,264 A | * | 12/1995 | Sarbadhikari et al. ... 348/231.6 |
| 5,557,328 A | * | 9/1996 | Ishihama et al. ........ 348/240.3 |
| 5,684,532 A | * | 11/1997 | Ely ....................... 348/240.99 |
| 5,701,157 A | * | 12/1997 | Kato et al. ............. 348/240.99 |
| 5,867,217 A | | 2/1999 | Okino et al. |
| 5,970,261 A | * | 10/1999 | Ishiguro et al. ................ 396/85 |
| 5,982,429 A | * | 11/1999 | Kamamoto et al. .... 348/333.06 |
| 6,041,195 A | * | 3/2000 | Honda et al. ................ 396/429 |
| 6,172,707 B1 | * | 1/2001 | Ouchi et al. ............. 348/208.6 |
| 6,204,880 B1 | * | 3/2001 | Nishimura ............. 348/240.99 |
| 6,396,538 B1 | * | 5/2002 | Kobayashi et al. .... 348/240.99 |
| 6,441,854 B2 | * | 8/2002 | Fellegara et al. ...... 348/333.13 |
| 6,559,888 B1 | * | 5/2003 | Doron ..................... 348/240.1 |
| 2002/0109782 | * | 8/2002 | Ejima et al. ........... 348/333.01 |

FOREIGN PATENT DOCUMENTS

| EP | 0560549 A2 | 8/1993 |
| JP | 0511703 | 7/1993 |
| JP | 10042183 | 2/1998 |

OTHER PUBLICATIONS

Search Report for EPO Application No. 99 11 4013 (based on U.S. application Ser. No. 09/239,899).

* cited by examiner

Primary Examiner—Aung Moe (57) ABSTRACT

A digital camera having a viewfinder includes a zoom control and switch arrangement that enables a user to zoom in and zoom out of an object image while visualizing in the viewfinder the optical and digital zooming effects selected by the user via the switch arrangement.

11 Claims, 7 Drawing Sheets

DIGITAL CAMERA WITH OPTICAL VIEWFINDER AND METHOD OF USING SAME TO VISUALIZE OPTICAL AND DIGITAL ZOOM EFFECTS

RELATED APPLICATIONS

This application is a continuation in part of U.S. patent application Ser. No.: 09/053819 entitled "Digital Camera and Method of Using Same," filed on Mar. 31, 1998.

FIELD OF INVENTION

The present invention relates generally to cameras, and more particularly, to a digital camera having a combined optical zoom and digital zoom feature.

BACKGROUND OF THE INVENTION

In general, both digital and analog cameras must give feedback to a user of what area of a scene to be photographed will be captured when a picture is taken. This has traditionally been accomplished using a built-in device called an optical viewfinder an optical window that enables the user to visualize the scene and see exactly what area of the scene will be captured by the camera lens system.

In order to change the area to be captured by the camera lens system, many digital and analog cameras also include what is commonly called a zoom feature. The zoom feature is limited to optical zooming in the analog camera but may include both optical zooming and digital zooming in a digital camera.

Before discussing the merits of optical and digital zooming, it may be beneficial to briefly review the difference between what is known in the state of the art as a through the lens (TTL) camera and a point and shoot (PAS) camera.

In the TTL camera, as a user views a scene to be photographed he or she utilizes the camera viewfinder. More particularly, the user is viewing the scene through the lens system of the camera. That is, with the help of an internally positioned mirror within the TTL camera, the light passing through the lens system is reflected by the internal mirror and directed to the optical viewfinder for consideration by the user. When the user is satisfied with the scene to be captured, the mirror is repositioned allowing a direct light path to the photosensitive plane of the camera, and thus, allowing the scene to be captured as viewed through the optical viewfinder.

The PAS camera is much less expensive and does not allow the user to view the scene through the primary lens system. Instead, the optical viewfinder is provided with a secondary lens system that moves in and out in tandem with the primary lens system. In short then, in the PSA camera two separate light paths are established; one light path for the primary lens system to the photosensitive plane of the camera and another light path through the secondary lens system to the viewfinder for the scene preview benefit of the user.

Considering now the merits of the two types of zooming, optical zooming and digital zooming, it will be understood by those skilled in the art that optical zooming is a mechanical operation that affects movement of the primary lens system so as to enlarge or reduce a viewed object. Thus, for example, by moving the primary lens system a user may, in a smooth mechanical transition, view a group arrangement of flowers down to a single flower within the group and then back to the entire arrangement. This transition is commonly called "zooming in" and "zooming out" of the scene.

With the advent of digital cameras and photography, two new developments emerged: imaging view display modules, known as liquid crystal display (LCD) units and digital zooming. With the LCD unit, a user is able to independently view the scene both before the image is captured, in a preview mode of operation, and after the image has been captured and stored, in a post-view or review mode of operation. In short then, the preview mode of operation is essentially the same mode of operation found in a TTL type of camera as the image displayed on the LCD is taken directly from the photosensitive plane of the digital camera that is otherwise called a charged couple device (CCD).

Digital zooming is an electrical manipulation that selects a portion of the image converted by the CCD so that the selected portion appears to be enlarged when viewed on the whole viewing area of the LCD. From the foregoing, it will be understood by those skilled in the art that the same effects of optical zooming can be achieved and viewed on the LCD without having to incur the high costs associated with providing a moving primary lens system. The trade off for such a benefit however, is degradation in the image quality as viewed on the LCD as the CCD utilizes fewer pixel locations.

In certain high end digital cameras, the degradation in image quality brought about by digital zooming is overcome by providing a conventional optical zooming feature. In this type of camera, the viewfinder tracks the camera lens to enable the user to visually see the effects of the optical zooming. Alternatively, the user may also view the effects of the optical zooming on the LCD in the preview mode of operation as the magnification is achieved by the primary lens system prior to the object image being converted by the CCD. In most situations however, the user will not utilize the LCD for the purpose of observing optical zooming as LCD use places a high electrical drain on the battery system of the camera.

Recently, certain digital cameras have been offered providing both optical and digital zooming. In such cameras, the user is able to select which one of the effects is desired to arrive at a desired magnification. Thus, for example to arrive at a 4x-magnification factor a user could select a 2x optical effect and a 2x digital effect.

While such combined effects are desirable in the preview mode of operation, the combined zooming effect has been less than desirable due to the high electrical drain on the camera battery system. That is as the user gets the "what you see is what you get" view of image data only by viewing the LCD image there is a constant power drain when the combined zoom effect is in operation.

From the foregoing, it should be understood that when the LCD is powered off, the user is limited to viewing only the optical zooming effects through the viewfinder. In this regard, in prior art digital camera with combined zoom features, the optical zoom is always enabled while the digital zoom is only enabled when the LCD is in a powered up state of operation. In this manner, the user would never be in a situation of guessing at what exactly is included in the scene to be captured.

While the above discussed cameras and methods of operation provide the combined effects of both optical and digital zooming, the effects of the digital zooming significantly reduce the useful operating period of the camera relative to the available battery power source. In other words, with a combined optical and digital zooming feature camera, the costs of operating the camera are significantly higher as expensive batteries must be replaced on a much more frequent basis.

Therefore it would be highly desirable to have a new and improved digital camera that includes both optical and digital zooming features while simultaneously facilitating low battery drainage. Such a new and improved digital camera should also be easy to use always permitting the user to know exactly what scene will be captured for image reproduction purposes whether operating in an optical zoom mode or a digital zoom mode.

DISCLOSURE OF THE INVENTION

In accordance with the present invention, a digital camera includes a zoom features that combines both optical zooming and digital zooming without requiring the use of a liquid crystal display (LCD) unit and thus, facilitates low battery drainage. The new and improved digital camera includes a motor activated primary lens and secondary lens system that operate in tandem over the optical zoom range of the camera. The user views the effects of the optical zoom through a viewfinder that sees the scene to be photographed through the secondary lens system. At the end of the optical zoom range the motor continues to drive the secondary lens system to provide the user with an optical simulation of the digital zoom effects. In short, the user is able to visualize a zoom factor indicative of the product of various optical and digital zoom factors without activation of a LCD unit. In the alternative, the LCD unit may be activated to permit the user to see the combined effects of optical and digital zooming in a preview mode of operation using the LCD unit. In the zoom mode of operation a zoom control algorithm facilitates a process wherein a microprocessor generates electrical signals to control the motor operation to provide the whole of both the optical zoom range and the digital zoom range in accordance with the novel method of using the digital camera.

BRIEF DESCRIPTION OF DRAWINGS

The above mentioned features of the present invention and the manner of attaining them will become apparent and the invention itself will be best understood by reference to the following description of the preferred embodiment of the invention, in conjunction with the accompanying drawings, wherein.

BEST MODE FOR CARRYING OUT THE INVENTION

Figure 1:
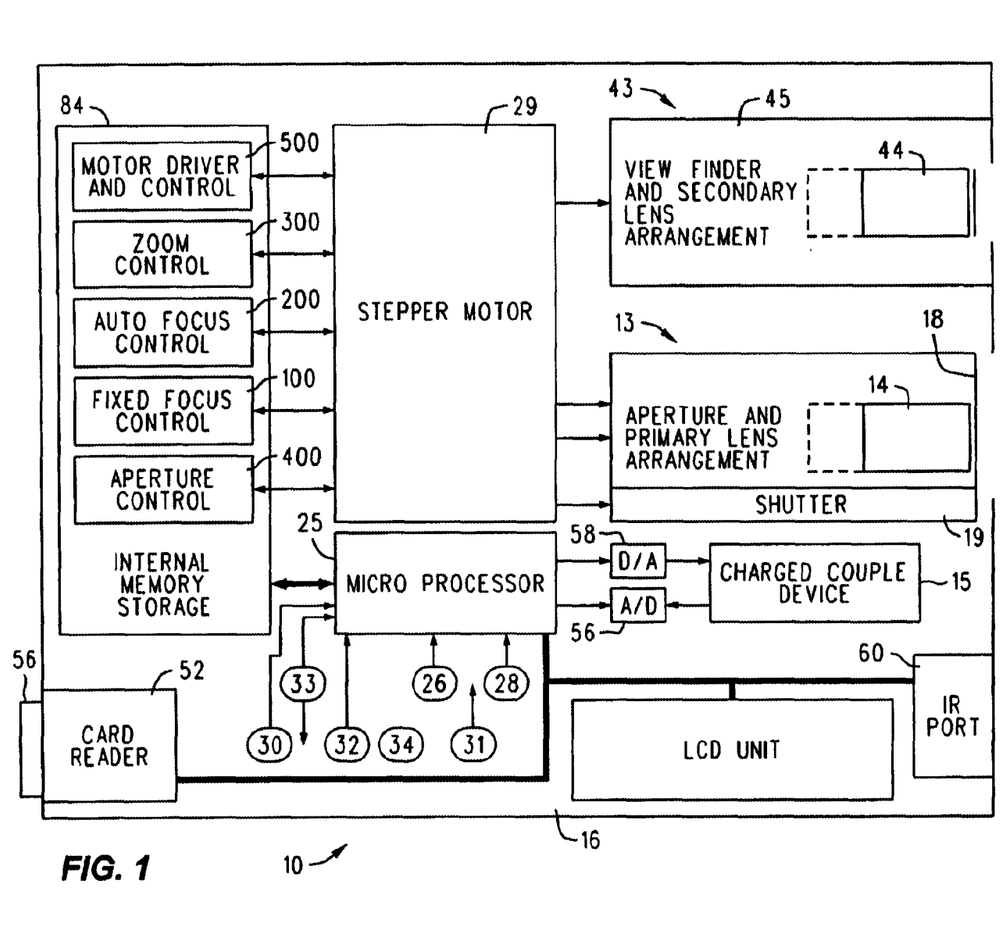
FIG. 1 is a diagrammatic representation of a digital camera that is constructed in accordance with the preferred embodiment of the present invention.
Figure 2:
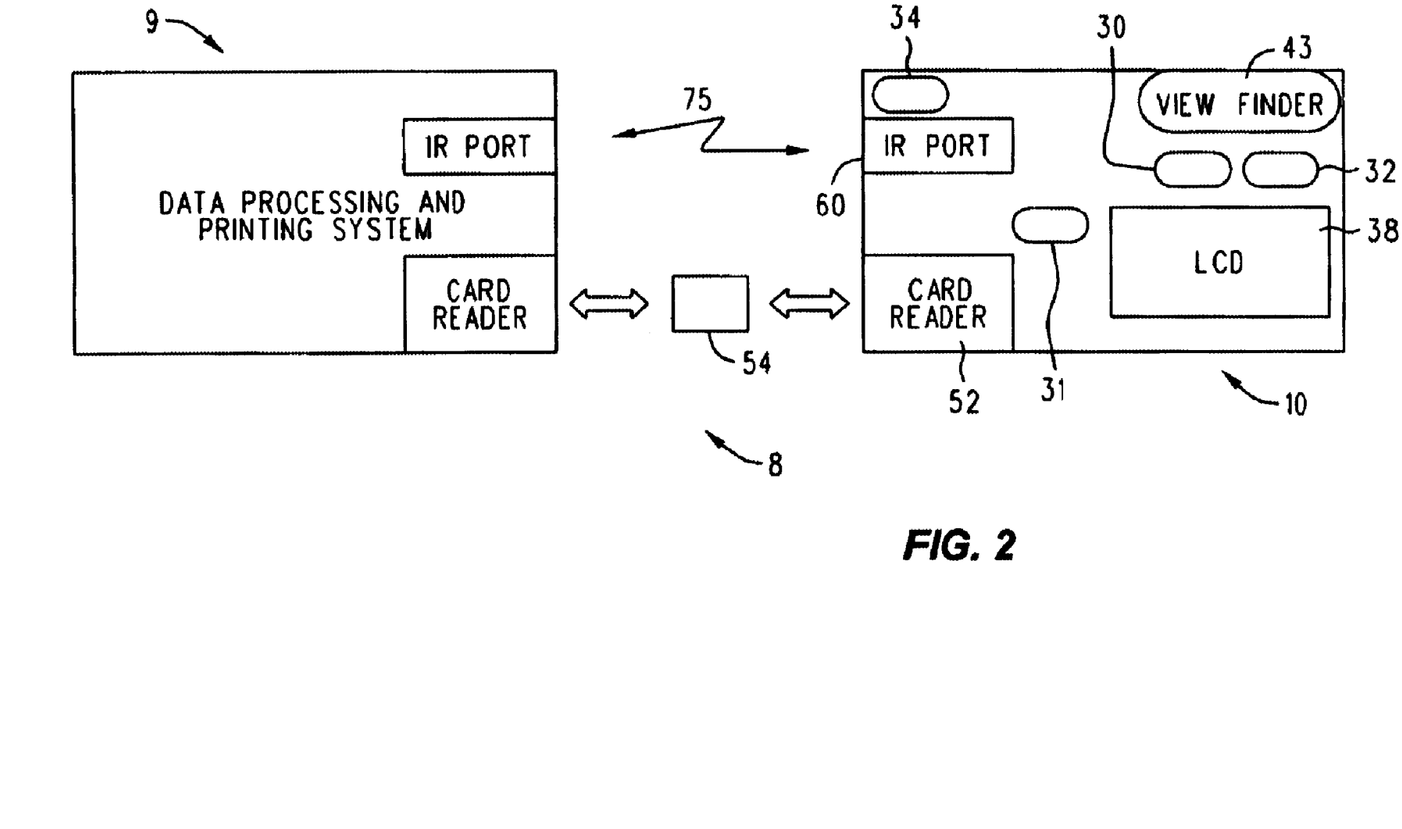
FIG. 2 is a block diagram of the digital camera of FIG. 1 illustrating its use with a data processing system.

Referring now to the drawings and more particularly to FIGS. 1–2, there is illustrated a digital camera system 8 which is constructed in accordance with the present invention. The digital camera system 8 captures and processes digital images for permanent or temporary view by a user.

Considering now the digital camera system 8 in greater detail with reference to FIGS. 1–2, the digital camera system 8 generally includes a data processing and printing system 9 for receiving and processing image data, and a digital camera 10 for capturing and storing the image data to be processed by the system 9. The data processing and printing system 9 can be configured in various hardware and software configurations that facilitates digital image processing such as a personal computer system having a processor or computer, a monitor, a digital card reader and a printer or a stand alone photo-printer having an IR port, a digital card reader and an internal micro-processor that permits image data received on a storage card module 54 or transmitted on an infrared wavelength via an IR communication channel, such as an IR channel indicated generally at 75 (FIG. 2).

In operation, the user utilizing the digital camera 10, selects a scene to be photographed and frames and focuses the image using the various camera controls that will be described hereinafter in greater detail so that the object scene can be captured and stored when the camera 10 is activated. Once the image has been captured and stored by the camera 10, the user can select the image either by itself or with other images that have been previously captured and stored to cause them to either be transmitted to the processing system 9 via the IR channel 75 or copy them to the storage card module 54 with various instruction commands such as how many of prints of each image are to be prepared, cropping instructions, rotating instruction, thumbnail instructions and the like. The storage card module 54 can then be removed from the camera 10 and inserted in the data processing and printing system digital card reader for processing purposes. More particularly, the image information and instructions when received by the processing system 9 are acted upon resulting in the preparation of image prints in accordance with the instructions of the user as entered via the camera 10.

Referring now to the drawings and more particularly to FIG. 1, there is shown in diagrammatic representation the digital camera 10, which is, constructed in accordance with the present invention. The camera 10 is configured for use with the image processing system 9 to facilitate the review, formatting and printing of high quality digital photographs. In the preferred embodiment of the present invention, the camera 10 includes both optical and digital zooming features as well as a fixed focus feature and an automatic focus feature, each of which will be described hereinafter in greater detail when the operation of the camera 10 is described.

The combined optical and digital zoom features are implemented with a significant reduction in the battery power drain of the camera 10 as will be further explained. The fixed focus mode of operation is aperture sensitive, allowing the camera 10 to default to the fixed focus mode of operation. In the fixed focus mode of operation, the camera 10 automatically adjusts its focal point and aperture setting relative to the amount of ambient light being received by the camera 10.

Considering the camera 10 in greater detail with reference to FIG. 1, the camera 10 generally includes a housing 16 having mounted therein a aperture/lens system or arrangement 13 that facilitates the zooming feature, aperture setting for light adjustments and the focusing features for image reproduction purposes. In this regard, the aperture/lens arrangement 13 generally includes a primary lens system indicated generally at 14 for focusing and optical zooming in and out of a scene to be captured, a shutter 19 for allowing the light indicative of the object to be captured to enter the photosensitive plane of the camera and an aperture 18 that is automatically adjusted for receiving the proper amount of light to assure proper image formation.

In order to allow the user to preview the scene to be captured, the camera 10 also includes a microprocessor 25 and liquid crystal display (LCD) unit 38 that are coupled electrically to a charged coupled device or CCD 15. The LCD unit 38 permits the user to visualize various message indications relative to camera control as well as previewing the effects of both optical and digital zooming before an image is captured. The CCD 15 is disposed in the primary light path for converting light to an electrical signal that is ultimately processed by the microprocessor 25 as will be explained hereinafter in greater detail. As best seen in FIG. 1, the primary light path extends from the aperture 18 to the charged couple device 15 via the primary lens system 14 and the shutter 19.

The microprocessor 25 and LCD unit 38 operate to provide one preview mode of operation that is substantially the same mode of operation as found in a through the lens (TTL) digital camera. That is, the user via the LCD unit 38 can view the effects of both optical zooming and digital zooming when the LCD unit 38 is placed in a power on condition. It will be appreciated however, by those skilled in the art, that in this LCD preview mode of operation, the LCD unit 38 places a significant battery drain on the electrical system of the camera 10.

The camera 10 also includes a zoom effect viewfinder arrangement 43 having a secondary lens system 44 and viewfinder 45. The viewfinder arrangement 43 operates in cooperation with a zooming algorithm 300, to provide the user with, in another preview mode of operation, a visualization of the object scene that will be captured. In this mode of operation, the user is able to visualize the object scene with no power applied to the LCD unit 38 to effect a significant increase in the operating period of the camera. In short then, in this viewfinder preview mode of operation, the LCD unit 38 does not exert a power drain on the electrical system of the camera 10 as the LCD unit 38 is not placed in a power on condition. A selection switch 33 allows a user to select a desired mode of operation: a viewfinder only mode of operation or a viewfinder and LCD unit mode of operation. In the viewfinder only mode of operation, a switch 30, forming part of a switch arrangement with switch 33, is set active. In the combined mode of operation, an LCD active switch 32, also forming part of the switch arrangement with switch 33, is set active. The selection switch 33 then functions as a zoom in and zoom out switch or a mode selection switch.

A stepper motor 29 coupled between the microprocessor 25 and the primary and secondary lens systems 14 and 44 respectively, causes the respective lens systems 14 and 44 to be moved for focusing and zooming purposes. The stepper motor 29 under the control of the microprocessor 25 and a fixed focus control algorithm 100 (FIG. 5) incrementally adjusts focal point of the primary lens system 14 when the camera 10 is operating in the fixed focus mode of operation. The stepper motor 29 under the control of the microprocessor 25 and the zoom control algorithm 300 also zooms the primary lens system 14 and the secondary lens system 44 over an optical zoom range between 1× magnification and 2× magnification. At the end of the optical zoom range, when the primary lens system 14 can no longer effect any greater zooming effects, the microprocessor 25 causes the stepper motor 29 to continue to move the secondary lens system 44 in such a manner as to simulate digital zooming effects that are directly viewable by the user without activating the LCD unit 38. That is, the secondary lens system 44 will continue to magnify the object scene as viewed in the viewfinder 43, even though the primary lens system 14 is no longer moving. In short then, the amount of magnification the optical viewfinder 43 will show is the product of the optical and digital zoom factors as shown in Table A.

For example, the optical zoom function has an operating range from about $Z_1$ to about $Z_n$ which is expressed in a series of finite steps as $Z_1, Z_2, Z_3, \ldots Z_n$. Thus, in optical zoom operations, the primary lens system 14 and the secondary lens system 44 move in tandem along their respective primary and secondary light paths in a series of continuous finite steps from $Z_1$ to $Z_n$ when the user zooms in to obtain a telescopic object image. Conversely, when the user zooms out to obtain a wide angle object image, the lens systems 14,44 move in an opposite direction in a continuous series of finite steps from $Z_n$ to $Z_1$.

Once the primary lens system 14 has been moved to its maximum optical zoom position at $Z_n$, no further optical zoom is possible. In this regard, if the user desires to continue to zoom in on an object image, the camera 10 automatically switches to the digital zoom mode.

In the digital zoom mode there is another series of finite magnification factor steps as $D_1, D_2, D_3, \ldots D_n$ to provide a continuous range from about $D_1$ to $D_n$. In this mode of operation, the microprocessor 25 causes the CCD 15 to manipulate its output signal to provide the effects of digital zooming that may be observed on the LCD unit 38 if the camera is operating in the LCD active mode. The practical effects of what is viewed on the LCD unit 38 is the product of the current optical zoom factor (for example $Z_n$) and the current digital zoom factor (for example $D_n$) to provide the overall effective zoom factor of $Z_n D_n$.

To permit the user to visualize this zooming effect in the viewfinder 45, the microprocessor 25, under the control of a zoom control program 300, causes the secondary lens system 44 to continue movement along the secondary light path from the maximum optical zoom position of $Z_n$ to a maximum effective zoom position of $Z_n D_n$. In short then, as the secondary lens system 44 travels along the secondary light path, the lens moves in a series of finite steps that simulate the optical digital zoom factor products that range from $Z_1 D_1$ as a minimum effective zoom product to $Z_n D_n$ as a maximum effective zoom product.

In the preferred mode of operation, the microprocessor 25 in response to the zoom in signal produced by the zoom switch 33 calculates the product of the current optical zoom factor and the current digital zoom factor to determine the positions that the stepper motor 29 needs to move the respective primary lens 14 and secondary lens 44. Thus for example, if the current optical zoom factor position is $Z_4$ and the current digital zoom factor position is $D_2$ the microprocessor 25 will cause the secondary lens system 44 to move to a position that simulates the effective optical digital zoom product of $Z_4 D_2$. As mentioned earlier Table A illustrates the effective zoom factors.

TABLE A

| Optical Zoom | Digital Zoom | Effective Zoom Product |
|---|---|---|
| Z1 | D1 | Z1D1 |
| Z2 | D1 | Z2D1 |
| Z3 | D1 | Z3D1 |
| . | . | . |
| . | . | . |
| ZN | D1 | ZND1 |
| ZN | D2 | ZND2 |
| . | . | . |
| . | . | . |
| . | . | . |
| ZN | DN | ZNDN |

Table B illustrates a series of different effective zoom magnification factors based on current optical zoom magnification factors and current digital zoom factors.

TABLE B

| Optical Zoom | Digital Zoom | Effective Zoom |
|---|---|---|
| 1 X | 1 X | 1 X |
| 1.5 X | 1 X | 1.5 X |
| 2 X | 1 X | 2 X |
| 2 X | 1.5 X | 3 X |
| 2 X | 2 X | 4 X |

From the foregoing, it should be understood by those skilled in the art that this approach improves ease of use for the user as the effects of optical zoom and digital zooming can be viewed through the viewfinder 43 or in the alternative, on the LCD unit 38 if the user so chooses to activated this device. As a further benefit, the use of the viewfinder 43 and secondary lens system 44 masks the need to know when one is optical zooming and digital zooming which concepts are difficult for the average user to comprehend.

Although in the preferred mode of operation the camera 10 has been described as including a stepper motor 29 to effect len movements, those skilled in the art will appreciate that other forms of motive means such as ac and dc motors can be utilized to effect such movement. Thus, there is no intention of limiting the scope of the present invention to merely a stepper motor.

It will also be appreciated by those skilled in the art that different switch arrangements may be utilized. For example a four to six switch arrangement could provide separate switches for optical zoom in, optical zoom out, digital zoom in, digital zoom out, viewfinder mode, LCD mode functions. As another example a single zoom in zoom out switch could be coupled with a three switch arrangement to select an optical zoom mode, a digital zoom mode and a LCD mode, where the viewfinder mode would be a default mode. Thus, as many different types and kinds of switches as well as menu selection functions are contemplated within the true scope of the present invention there is no intention of limiting the invention to the switch arrange as shown and described.

Figure 3:
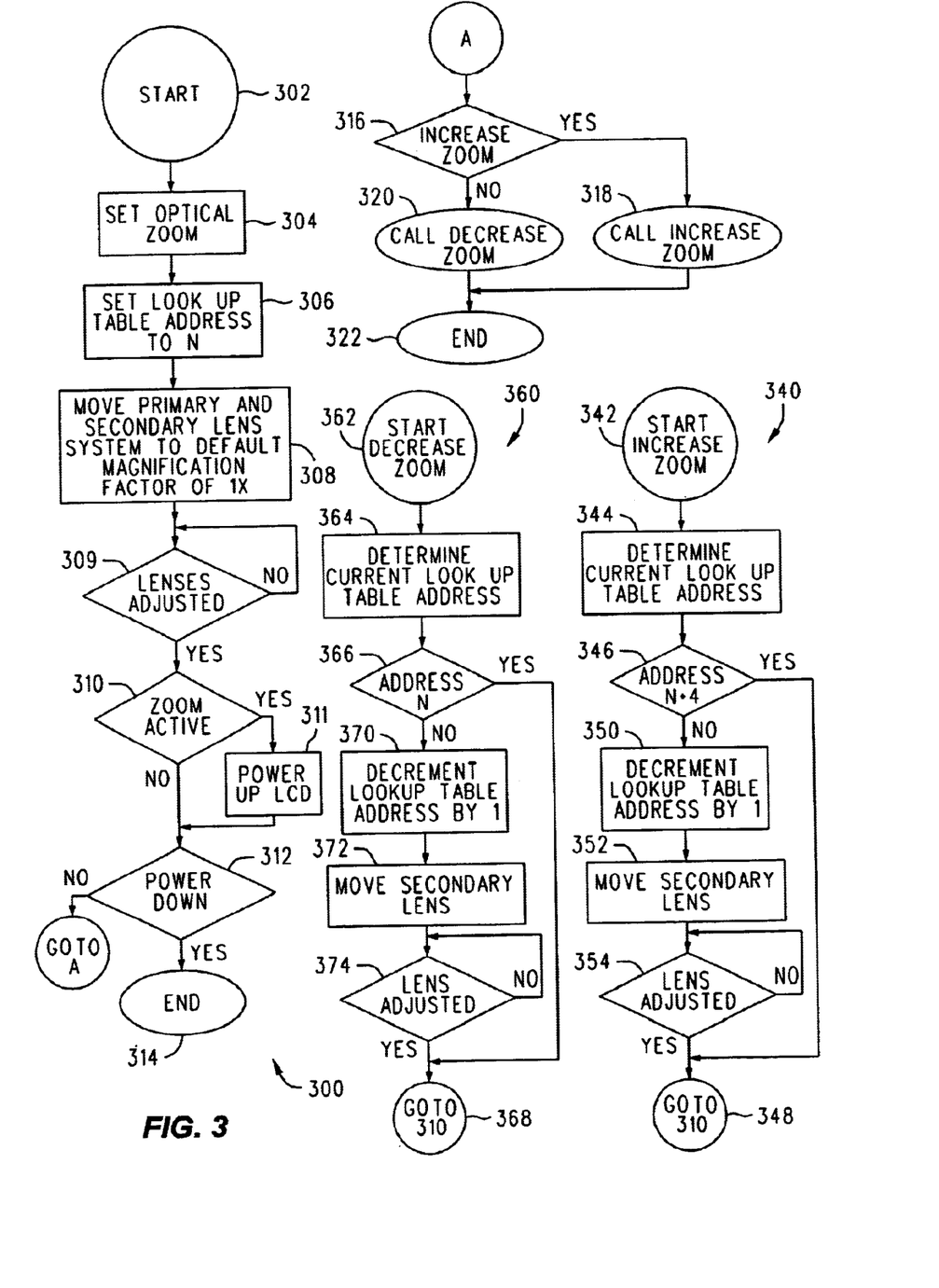
FIG. 3 is a high-level zoom control flow chart illustrating the operational steps of the digital camera of FIG. 1.

Considering now the zooming algorithm 300 in greater detail with reference to FIG. 3, the zooming algorithm 300 begins at a start command 302 whenever power is applied to the camera 10. The program immediately advances to a command step 304 that causes the viewfinder zoom switch 32 to be set to an active state and the LCD zoom switch 30 to an inactive state. The program then advances to a command step 306 that set a setting in the internal memory 84 to 1 that establishes an optical zoom factor at a 1× magnification and a digital zoom factor to 1× magnification to provide an overall 1×-combine magnification.

After the optical and digital zoom factors have been set, the program proceeds to a command step 308 that causes a motor control algorithm 500 to drive the stepper motor 29 so that the primary lens system 14 and the secondary lens system 44 are both moved in tandem to provide a 1× magnification factor. As motor drivers are conventional and well known to those skilled in the art the motor control algorithm 500 will not be described hereinafter in greater detail.

After the magnification factors have been set, the program proceeds to a determination step 309 to verify that the lenses have been adjusted. The program loops at step 309 until the stepper motor 29 has adjusted the lenses 14 and 44 to their proper positions. Next the program goes to a determination step 310 to determine whether the user has activated the zoom switch 33 to change the operation mode from the viewfinder mode to the LCD mode. If the user has not activated the mode switch 33 to change modes, the program proceeds to a determination step 312 to sense whether the user desires to power down the camera 10. If the user desires to power down the camera 10, the program then proceeds to an end step 314 and powers down the camera 10. If the user has not activated the power switch, the program jumps to the determination step 316 and proceeds as will be described hereinafter. Stated otherwise, the camera 10 is now in a ready state waiting for the user to activate the zoom switch 33 to either increase or decrease the zoom settings.

At the determination step 312, if a determination is made that the user has not initiated a power camera down sequence, the program advances to another determination step 316 to determine whether the user is attempting to increase or decrease the zoom factors. If the user is attempting to increase zooming, the program branches to a call step 318 that calls an increase zoom subroutine 340. The increase zoom subroutine 340 increases the zoom magnification factors so long as the user continues to hold the zoom switch 33 in an increase zooming state. On the other hand, if the user is attempting to decrease zooming, the program branches to another call step 320 that calls the decrease zoom subroutine 360. The decrease zoom subroutine 360 decreases the zoom magnification factors so long as the user continues to hold the zoom switch 33 in a decrease zooming state.

Considering now the increase zoom subroutine 340 in greater detail with reference to FIG. 3, the increase zoom subroutine 340 begins at a start step 342 that is entered from the call step 318. The subroutine then goes to a command step 344 that determines the current optical zoom and digital zoom settings. The subroutine then proceeds to a determination step 346 to determine whether the current settings are set to a maximum setting of N If the current settings are set to N, the camera 10 is set to its maximum zoom factors that provide a maximum of a combine optical zoom and digital zoom of a 4×-magnification factor. In this regard, no further magnification is possible and the subroutine exits via a go to step 359 to the main program at step 310 and continues as previously described.

If the current setting is not set to the maximum (N), the program advances to a command step 350 that increments the current setting by one. Next the subroutine proceeds to a command step 352 that causes the stepper motor 29 to move the secondary lens system 44 to its appropriate position to achieve the desired magnification factor established by the setting. The subroutine then goes to a determination step 354 to verify that the secondary lens 44 has been moved. The subroutine then goes to a determination step 356 to determine whether the primary lens 14 needs to be adjusted to provide the overall effective magnification as determined by the current settings. If an adjustment is necessary the subroutine activates the stepper motor 29 and advances to step 358 to wait for the stepper motor 29 to adjust the position of the primary lens 14. Once the primary lens 14 has been properly positioned, the program proceeds to the go to step 359 and proceeds as previously described.

If a determination is made at step 356 that the primary lens 14 does not need to be adjusted to effect the overall magnification factor as set, the subroutine then returns to the main program at step 310 via the go to step 359 and continues as previously described.

Considering now the decrease zoom subroutine 360 in greater detail with reference to FIG. 3, the decrease zoom subroutine 360 begins at a start step 362 that is entered from the call command 320. The subroutine then proceeds to a command step 364 that retrieves the current settings. Next the program goes to a determination step 366 that determines whether the current setting for zoom factors is set to the minimum setting of a 1× magnification factor. If the system is set to the minimum value of 1, the camera is set to its minimum factors to provide a minimum 1× combined magnification factor. In this regard, no further decrease in magnification is possible and the subroutine exits, via a go to step 379 to the main program at step 310 and continues as previously described.

If the current setting is not set to 1, the subroutine advances to a command step 370 that decreases the current setting by one. Next the subroutine proceeds to a command step 372 that causes the stepper motor 29 to move secondary lens system 44 to its appropriate position to achieve the desired magnification factor established by the new setting. The subroutine waits at a determination step 374 for the lens 44 to be adjusted. Once the secondary lens 44 has been adjusted the subroutine then advances to a determination step 376 to determine whether the primary lens 14 needs to be adjusted to effect the magnification factor determined by the current setting. If no adjust is necessary the subroutine go to the main program at step 310 via the go to step 379 and continues as previously described.

If at step 376 a determination has been made that the primary lens 14 needs to be repositioned, the stepper motor 29 is activated and the program advances to a determination step 378 to verify that the primary lens 14 has been repositioned. The subroutine waits at step 378 until the primary lens has been adjusted. The subroutine then advances to the go to step 379 and proceeds as described previously.

From the foregoing it should be understood that the user can zoom in or zoom out visualizing the effects of both optical and digital zooming either using the viewfinder 45 or the LCD 38 depending upon which operating mode the user has selected.

Considering now the focusing of the camera 10 in greater detail with reference to FIG. 1, the camera 10 includes a fixed focus mode of operation as well as an automatic focus mode of operation. In the fixed focus mode, the camera 10 as will be explained hereinafter in greater detail automatically adjusts its focal point and aperture setting relative to the amount of ambient light being received through the primary lens system 14 of the camera 10.

In order to facilitate the fixed focus mode and the automatic focus modes of operation, the camera 10 includes the adjustable aperture 18 that cooperates with the primary lens arrangement 14 and the shutter 19 for admitting light to the charged couple device 15 for a predetermined period of time. The charged couple device 15 converts the light that is received into an electrical signal that is indicative of an object to be photographed as well as the ambient light conditions surrounding the object.

Figure 4:
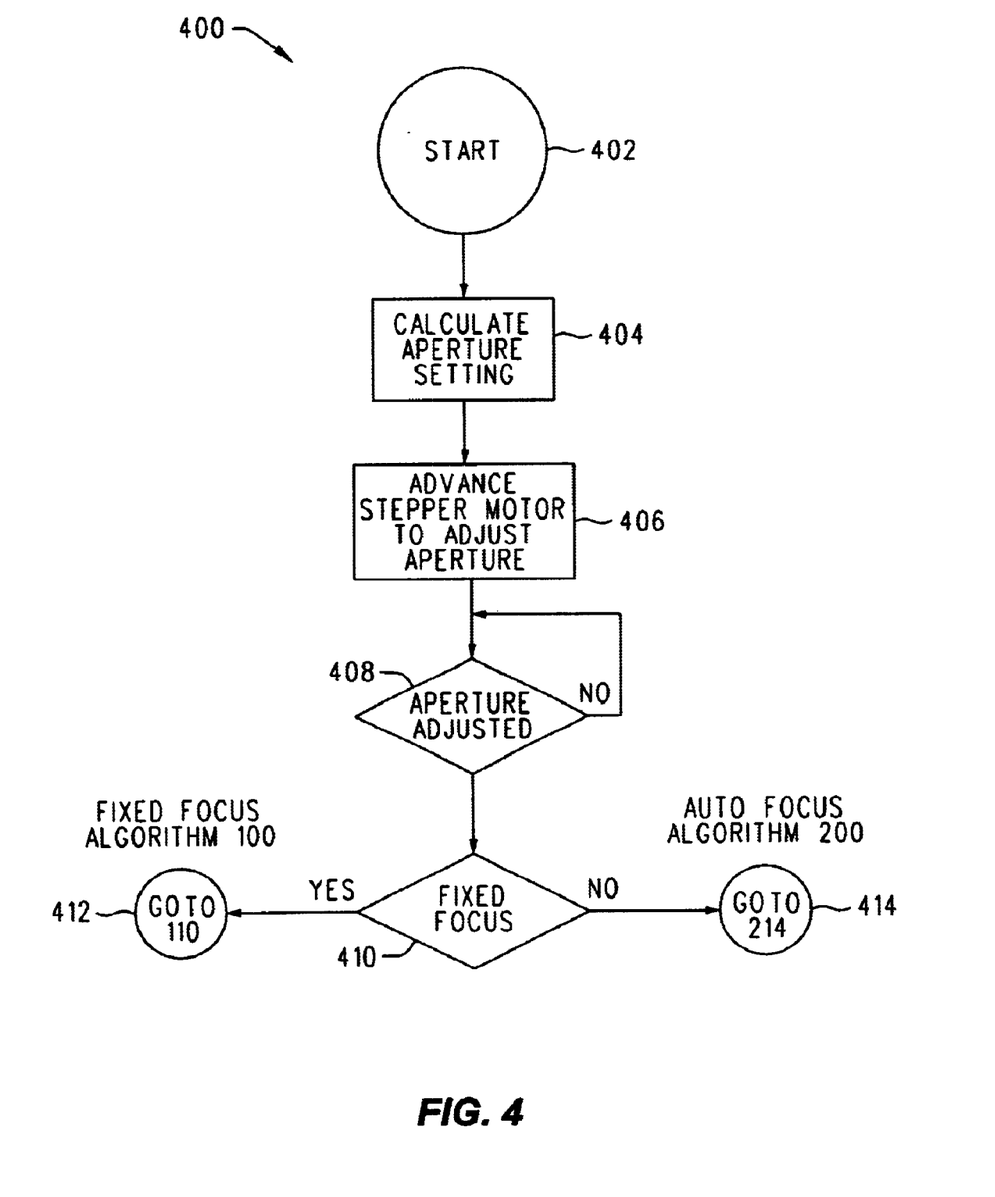
FIG. 4 is a high-level aperture setting flow chart illustrating the operational steps of the digital camera of FIG. 1.

An analog to digital converter 56 converts the electrical signal generated by the charged couple device 15 into a digital signal that is coupled to the microprocessor 25. The microprocessor 25 through various ones of the algorithms embodied therein, as will be explained hereinafter in greater detail, automatically places the camera 10 in the fixed mode of operation upon the camera being activated. The microprocessor 25 also causes the aperture 18 of the camera 10 to be adjusted to an optimal setting and then automatically adjusts the focal point of the camera 10 to facilitate ease of use by the camera user. More specifically these automatic adjustments and setting are achieved through an a fixed focus mode algorithm 100 (FIG.5), an automatic focus mode algorithm 200 (FIG. 11) and an aperture control algorithm 400, (FIG.4) each of which, will be described hereinafter in greater detail.

Figure 5:
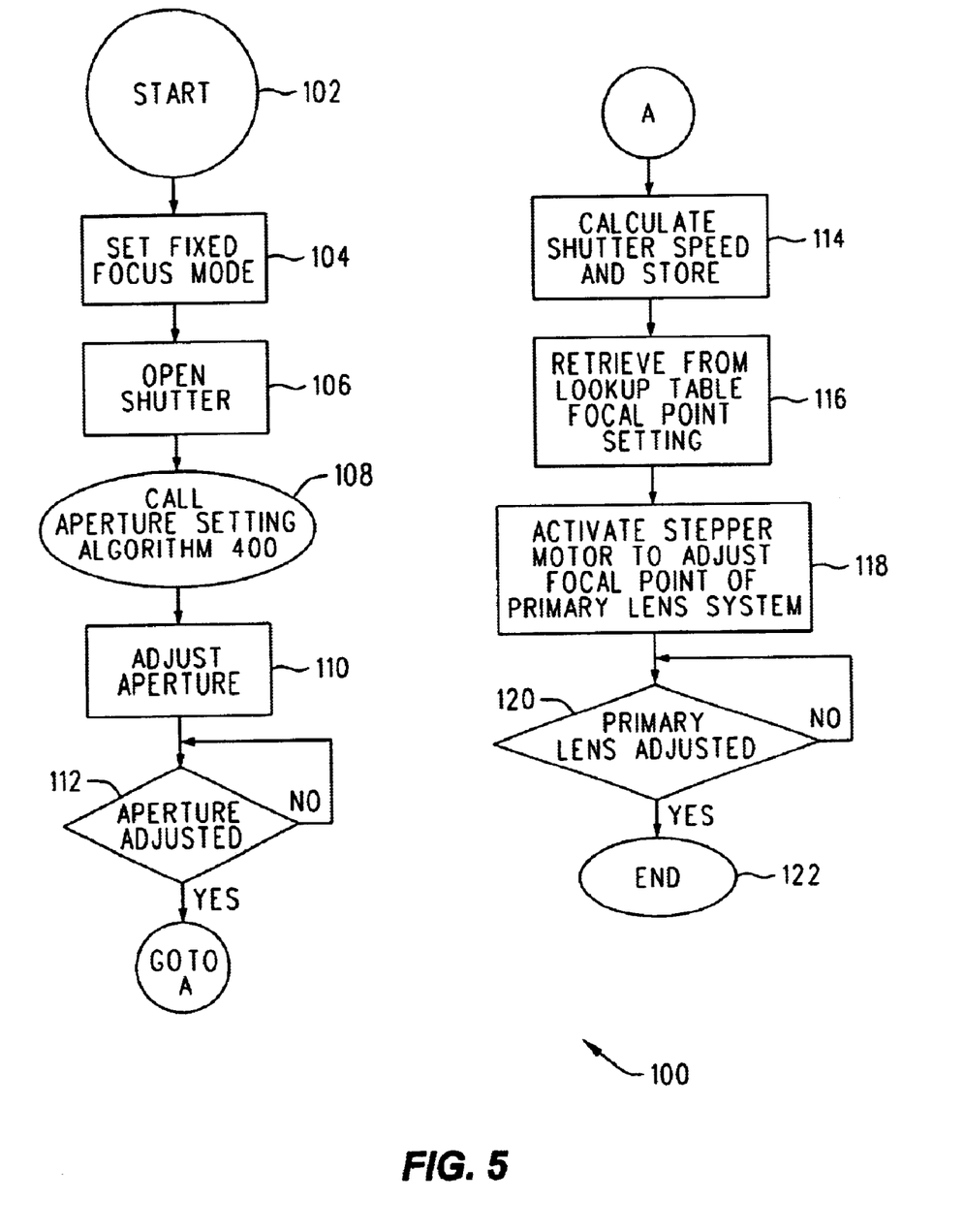
FIG. 5 is a high-level fixed focus mode flow chart illustrating the operational steps of the digital camera of FIG. 1.
Figure 6:
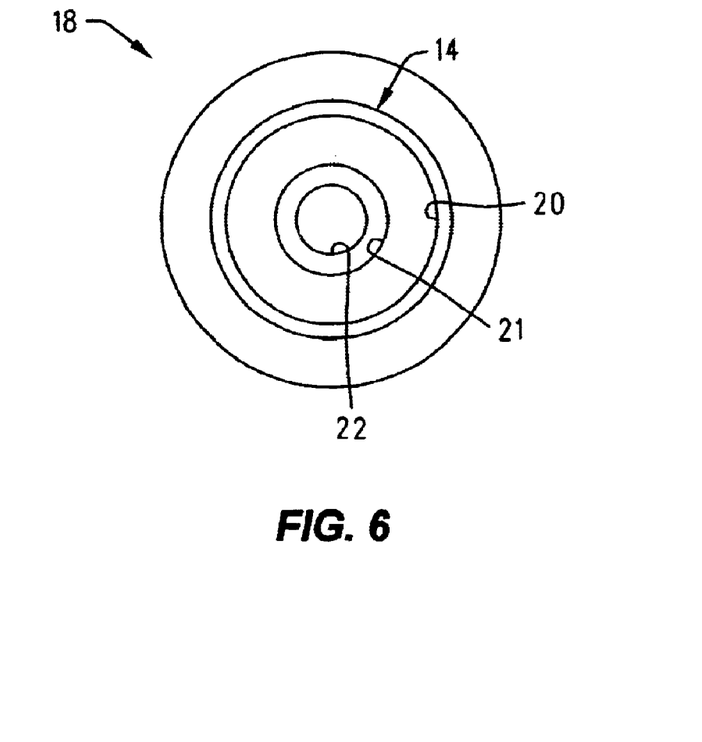
FIG. 6 is a diagrammatic representation of a front face view of an aperture lens arrangement within the digital camera of FIG. 1.
Figure 7:
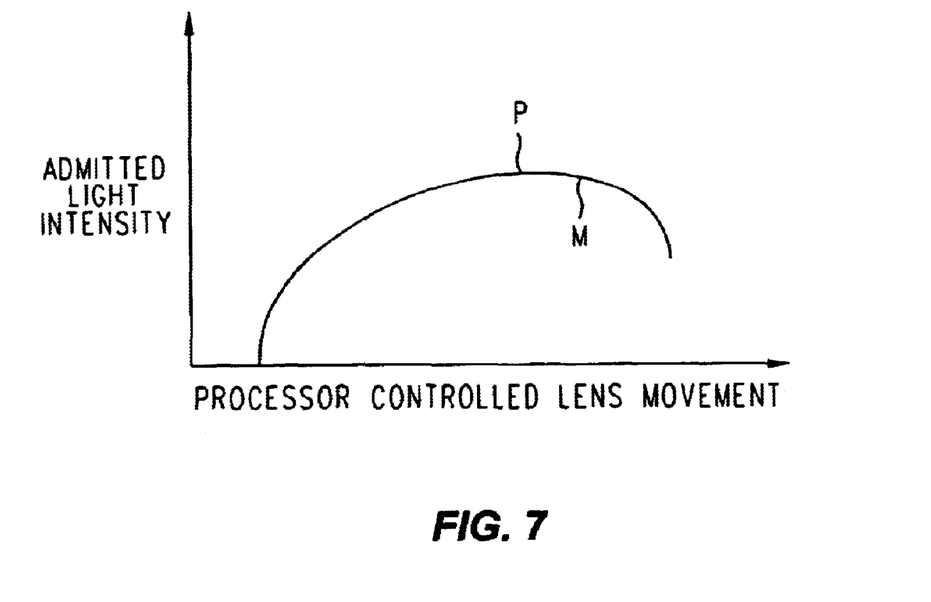
FIG. 7 is a graphical representation of admitted light intensity vs. lens movement within the digital camera of FIG. 1.
Figure 8:
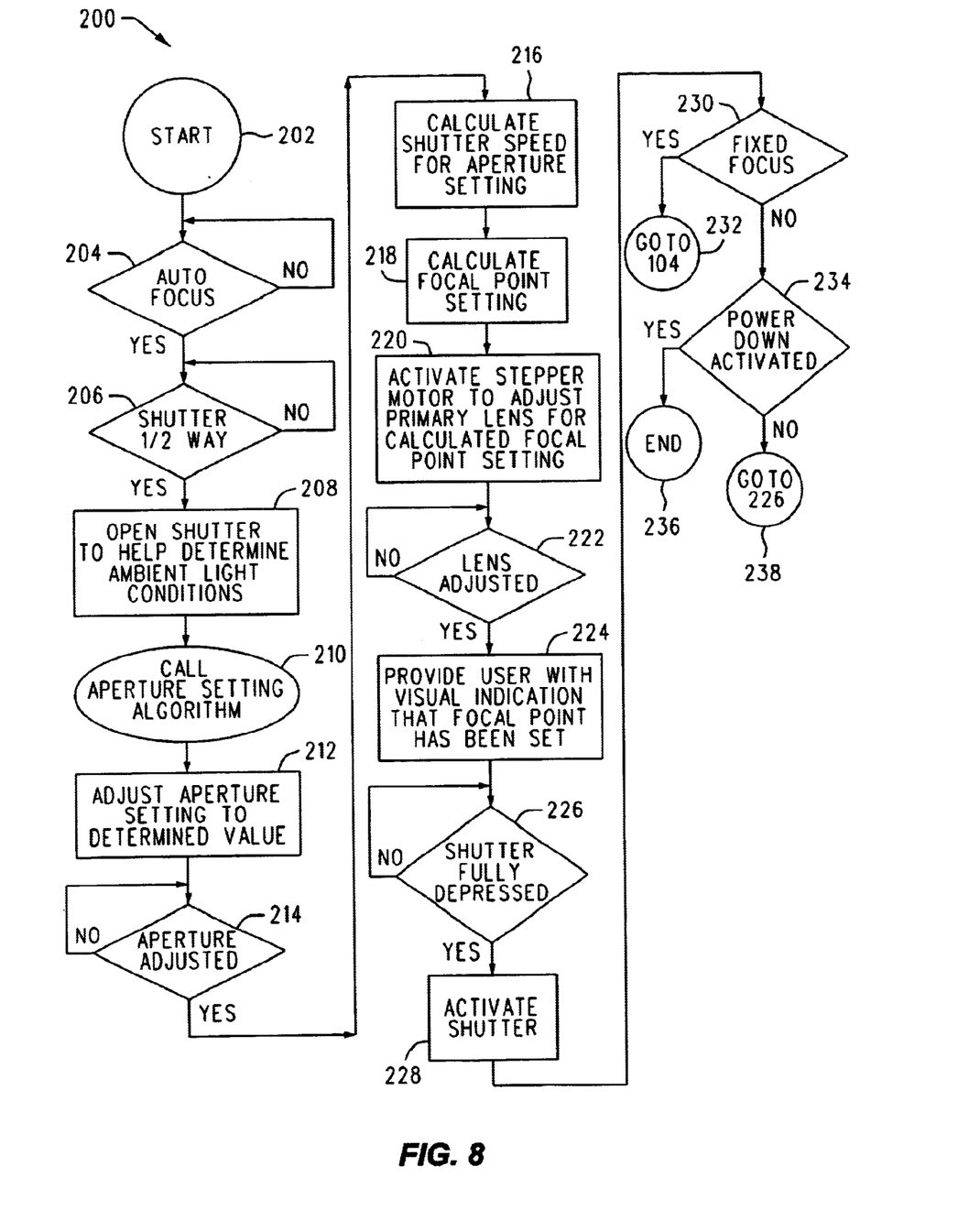
FIG. 8 is a high-level auto focus mode flow chart illustrating the operational steps of the digital camera of FIG. 1.

Considering now the fixed focus mode algorithm 100 in greater detail with reference to FIG. 5, the fixed focus mode algorithm 100 is responsive to the optimal setting of the aperture 18 as determined by the aperture control algorithm 400, and automatically moves the primary lens system 14 to a predetermined focal point. In the fixed focus mode of operation, the following operational steps are achieved:

1. The algorithm 100 causes the shutter 19 to be opened allowing the microprocessor 25 to receive a digital signal indicative of the ambient lighting conditions.
2. The algorithm 100 based on the determined ambient lighting conditions determines an appropriate shutter speed and aperture size for facilitating the capturing of a properly exposed image object.
3. The algorithm 100 based on the determined aperture size causes the primary lens 14 to be moved to a predetermined focal point for proper focusing of the image object to be captured. Each aperture size has a corresponding focal point. Thus, since there are three different aperture size settings there are three corresponding focal point settings in the fixed focus mode of operation. A look up table stored in the internal memory storage device 84 is accessed by microprocessor 25 so that it retrieves a proper focal point setting based upon the aperture size determined by the algorithm 400. Since the camera 10 has the capability of using aperture size to maximize the range within which an object is located, and still be in focus the camera 10 is referred to as "aperture sensitive". This is an important feature of the camera 10 as the fixed focus mode of operation is the default mode. Such a default mode saves a substantial amount of time in comparison to prior art cameras that power up in an automatic focus mode, as only one primary lens movement is required.

Considering now the fixed focus mode algorithm 100 in still greater detail with reference to FIG. 5, the fixed focus mode algorithm 100 begins at a start command 102 when power is applied to the camera 10. The program then proceeds to a command instruction 104 that places the camera 10 in the fixed focus mode of operation changing the focus switch 31 from its normally neutral position to a fixed focus mode setting indicated at 26.

From the command instruction 104 the program goes to a determination step 105 to wait for the user to activate the shutter button 36 to a ½ way position to initiate an adjustment. The program advances from step 105 to a command step 106 when the shutter button 36 has been depressed to the adjust position. Step 106 causes the shutter 19 to be fully opened exposing the CCD 15 to the ambient lighting conditions via the primary lens system 14. Once the microprocessor 25 receives the digital signal indicative of the ambient lighting conditions, the program advances to a call command step 108 that calls the algorithm 400 that calculates a proper aperture setting and shutter speed based upon the strength of the ambient light signal received by the microprocessor 25. The aperture shutter speed control algorithm 400 will be discussed hereinafter in greater detail.

After the aperture setting and shutter speed has been determined by reference to a simple look up table, via the algorithm 400, the program returns to the fixed focus mode algorithm at a command step 110 that causes the stepper motor 29 to adjust the size of the aperture to a determined one of its three primary aperture settings indicated at 20,21, and 22 respectively. The program then proceeds to a determination step 112 to verify that the aperture 18 has been set to its proper setting.

Once the aperture 18 has been adjusted, the program proceeds to a command step 116 that retrieves from a look up table in the internal memory 84 a focal point setting. From the command step 116 the program advances to a command step 118 that causes the stepper motor 29 to move the primary lens system 14 to the retrieve focal point setting. The program goes to a determination step 120 that determines whether the lens 14 has been adjusted. Once the lens focal point is set, the program proceeds to an end command 122.

Considering now the automatic focus mode algorithm 200 in greater detail with reference to FIG. 11, in order to place the camera 10 in the automatic focus mode of operation, the user toggles the focus from its normally fixed focus position at 26 to an automatic focus mode setting indicated at 28. Once the camera 10 is placed in the automatic focus mode, the user is free to depress a shutter release button or switch 34 to an initial half way stop position for generating an electrical signal that causes the microprocessor 25 to execute the automatic focus mode algorithm 200. In the automatic focus mode of operation, the following operational steps are achieved while the shutter release button is disposed at its initial half way stop position:

1. The algorithm 200 causes the shutter 19 to be opened allowing the microprocessor 25 to receive a digital signal indicative of the ambient lighting conditions.
2. The algorithm 200 causes the LCD 38 to provide a new indication to the user, such as a blinking indication, that the primary lens system 14 has been adjusted to the proper focal point. Once the user sees this new indication, the shutter release button 34 may be fully depressed resulting in the capturing and storing of a digital image in proper focus.

The setting determined in the above described procedure are maintained for subsequent shutter actuation to facilitate ease of use by the user.

Considering now the auto focus mode algorithm 200 in still greater detail with reference to FIG. 11, the auto focus mode algorithm 200 begins at a start command 202 when power is applied to the camera 10. The program then proceeds to a determination step 204 to detect whether the user has activated the focus switch 31 to place the camera in the auto focus mode of operation. In this regard, the program loops at the determination step 204 until the user activates the toggle switch 31 to place the camera in the auto focus mode.

From the determination step 204 the program proceeds a determination step 206 to wait for the user to depress the shutter button 34 to its halfway stop point. When the user depresses the shutter button 34 to its half way stop point, the program advances to a command step 208 that causes the shutter 19 to b e fully opened exposing the CCD 15 to the ambient lighting conditions via the primary lens system 14. Once the microprocessor 25 receives the digital signal indicative of the ambient lighting conditions, the program advances to a call command step 210 that calls the algorithm 400 that determines a shutter speed and proper aperture setting based upon the strength of the ambient light signal received by the microprocessor 25.

After the aperture setting and shutter speed has been determined in algorithm 400, the program returns to the auto focus mode algorithm 200 at a command step 212 that causes the stepper motor 29 to close the shutter 19 and to adjust the size of the aperture to the determined one of its three primary aperture settings indicated at 20,21, and 22 respectively. The program then proceeds to a determination step 214 to verify that the aperture 18 has been set to its proper setting.

Once the aperture 18 has been adjusted, the program proceeds to a command step 216 that calculates a proper shutter speed for the determined aperture setting. The shutter speed is stored in the internal memory 84 of the microprocessor. The program then advances to a call step 218 that calculates a focal point position for the primary lens 14 based upon the amount of ambient light being received by the CCD 15. This determination is made so the CCD 15 will receive the maximum amount of light possible based on the current ambient light conditions. The algorithm that calculates the focal point position is well known to those skilled in the art and will not be described hereinafter in greater detail. The program then goes to a command step 220 that causes the stepper motor 29 to advance the lens system 14 to the determined position.

Next the program proceeds to a determination step 222 to wait for the lens system 14 to be moved to its proper position. Once the lens system 14 has been adjusted the program goes to a command step 224 that causes the LCD unit 38 to blink at a desired blink frequency to provide the user with an indication that the lens system 14 has been adjusted and that the camera is now in a ready state for a photograph to be taken.

The program then goes to a determination step 226 to wait for the user to fully depress the shutter button 34. In this regard, when the user fully depresses the shutter button 34 the program advances from the determination step 226 to an activate command 228 that activates the shutter 19 at the determined shutter speed to expose the CCD 15.

The program then goes to a determination step 230 to verify whether or not the user has activated the focus switch 31 to change the camera back to the fixed focus mode of operation. If it is determined that the user has changed the mode of operation, the program proceeds to the fixed focus mode algorithm 100 at the command 105 where the program proceeds as described previously.

If a determination is made at step 230 that the user desires to continue operating in the auto focus mode of operation, the program goes to a determination step 234 to determine when the user desires to power down the camera 10. If the user desires to power down the camera 10, the program advances to an end step 236 to exit the auto focus algorithm 200. If the user does not desire to power down the camera, the program goes to a go to step 238 that returns to the determination step 206 to wait for the user to again depress the shutter button 34. In this manner, the camera remains adjusted for continuous shooting of additional images until the user either changes the auto focus mode to the fixed focus mode or the camera is powered down to an off power condition.

Considering now the aperture control algorithm 400 in greater detail, the aperture control algorithm is responsive to the digital signal provided through the analog to digital converter 56 an automatically adjusts the aperture 18 to an optimal setting relative to the amount of ambient light conditions surrounding the object to be photographed. In this regard, the algorithm 400 is entered at a start command 402 (FIG.4) from either the call command 108 in the fixed focus mode algorithm 100 or the call command 216 in the auto focus mode algorithm 200. The program then proceeds to a command 404 that determines the proper aperture setting for the given or measured ambient light conditions.

Once the proper aperture setting has been determined at step 404, the program goes to another determination step 405 to determine a shutter speed base on the determined aperture setting. The program then advances to a move command at step 406 that causes the stepper motor 29 to move the aperture 18 to one of its three primary positions as best seen in FIG. 9. The aperture settings are conventional camera settings of 2.8, 5.6, and 11 which settings are indicated generally at 20,21 and 22 respectively. The program then goes to a return step 408 that returns the program to the active focus control 100 or 200 depending upon which focus mode the camera 10 was set to operate. If the camera is operating in the fixed mode the program advances to step 110, in the fixed focus mode algorithm 100, otherwise the program advances to step 212 in the auto focus algorithm 200.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

I claim:

1. A digital camera having a viewfinder for viewing an object image, comprising:
    a zoom control switch arrangement for enabling a user to zoom in and zoom out of an optical visualization of the object image;
    a zoom control responsive to said zoom control switch arrangement for effecting zooming of the object image in the viewfinder;
    said zooming the object image in the viewfinder being an effective zoom indicative of the effects of optical zoom and digital zoom;
    wherein said zoom control switch arrangement includes:
        a zoom in switch for generating a zoom in control signal; and
        a zoom out switch for generating a zoom out control signal;
        wherein said zoom control includes:
            a primary lens arrangement mounted in a primary light path for facilitating the capture of the object image with optical zoom effects;
            a secondary lens arrangement mounted in a common light path with the viewfinder for facilitating the visualization of the object image with optical zoom and digital zoom effects;
            a motor arrangement for moving the secondary lens arrangement along at least a portion of said common light path to help effect the visualization of the optical zoom effects;
            said motor arrangement for moving the secondary lens arrangement along at least another portion of said common light path to help effect the visualization of the optical zoom and digital zoom effects;
            said motor arrangement further for moving the primary lens arrangement along at least a portion of said primary light path for helping to effect the capture of the object image with optical zoom effects; and
            a microprocessor coupled to said motor arrangement and responsive to said zoom in control signal and said zoom out control signal for controlling the movement of said secondary lens arrangement to effect the visualization of the optical zoom and digital zoom effects in the viewfinder.

2. A digital camera according to claim 1, further comprising:
    a control program for causing said microprocessor to operate in a predetermined manner in response to said zoom in control signal and said zoom out control signal;
    said control program for helping to cause said primary lens arrangement to move along said at least a portion of said primary light path to help effect the capture of the object image with optical zoom effects and for helping to cause said secondary lens arrangement to move along said at least a portion of said common light path to help effect visualization of the object image with optical zoom effects in the viewfinder; and
    said control program for further helping to cause said secondary lens arrangement to move along said at least another portion of said common light path to help effect visualization of the object image with optical zoom effects and digital zoom effects in the viewfinder.

3. A digital camera according to claim 2, wherein said control program helps facilitate a combined optical zoom effect and digital zoom effect in a predetermined zoom in order of continuous finite steps from a 1× optical zoom factor by a 1× digital zoom factor to provide an effective 1× zoom factor, to a 2× optical zoom factor by a 2× digital zoom factor to provide an effective 4× zoom factor.

4. A digital camera comprising:
    a primary lens system disposed in a primary light path, said primary lens being moveable between about a 1× optical magnification factor and about a 2× optical magnification factor;
    a secondary lens system disposed in a secondary light path, said secondary lens being moveable in tandem with said primary lens between about another 1× optical magnification factor and another 2× optical magnification factor;
    a viewfinder disposed in said secondary light path for observing the magnification of an object to be reproduced digitally, the object being subject to magnification over a combined optical digital magnification factor range from about a 1× magnification factor to about a 4× magnification factor;
    a stepper motor coupled to said primary lens system and to said secondary lens system for moving said secondary lens system in tandem with said primary lens system between about said another 1× optical magnification factor and about said another 2× optical magnification factor;
    a microprocessor coupled to said stepper motor for causing said stepper motor to move said primary lens system along said primary light path in tandem with said secondary lens as it moves along said secondary path to facilitate visualization of the object as it is magnified optically by aid primary lens; and a control program acting on said microprocessor to cause said secondary lens system to move along another portion of said secondary light path to facilitate visualization of the optical magnification of the object, said secondary lens being movable along said another portion of said secondary light path between about said 2× optical magnification factor and about a 4× optical magnification factor.

5. A digital camera according to claim 4, further comprising:

a charged coupled device responsive to said microprocessor for causing the generation of an electrical signal indicative of the object magnified between about 1× digital magnification factor and said about 2× digital magnification factor to facilitate digital magnification of the object.

6. A digital camera method of visualizing an object to be digitally captured, comprising:

moving a primary lens along at least a portion of a primary light path to facilitate optical magnification of the object to be captured between about a 1× optical magnification factor and a 2× optical magnification factor;

manipulating an electrical signal to facilitate digital magnification of the object to be captured between a 1× digital magnification factor and a 2× digital magnification factor; and moving a secondary lens along at least a portion of a secondary light path to facilitate visualization of the object image with a combined optical zoom and a digital zoom effects of between about a 1×-magnification factor and about a 4×-magnification factor.

7. A digital camera method of visualizing an object according to claim 6, further comprising:

observing in a viewfinder disposed in said secondary light path said combined optical zoom and digital zoom effects.

8. A digital camera system, comprising:

a digital camera having a viewfinder and display for viewing an object image;

said digital camera further including:

a zoom control switch arrangement for enabling a user to zoom in and zoom out of an optical visualization of the object image; and a zoom control responsive to said zoom control switch arrangement for optically and digitally zooming the object image in the viewfinder;

wherein said zoom control switch arrangement includes:

a zoom in switch for generating a zoom in control signal; and a zoom out switch for generating a zoom out control signal;

wherein said zoom control includes:

a primary lens arrangement mounted in a primary light path for facilitating the capture of the object image with optical zoom and digital zoom effects;

a secondary lens arrangement mounted in a common light path with the viewfinder for facilitating the visualization of the object image with optical zoom and digital zoom effects;

a motor arrangement for moving the secondary lens arrangement along at least a portion of said common light path to help effect the visualization of the optical zoom effects;

said motor arrangement motor for moving the secondary lens arrangement along at least another portion of said common light path to help effect the visualization of the optical zoom and digital zoom effects;

said motor arrangement further for moving the primary lens arrangement along at least a portion of said primary light path for helping to effect the capture of the object image with optical zoom effects; and a microprocessor coupled to said motor arrangement and responsive to said zoom in control signal and said zoom out control signal for controlling the movement of said secondary lens arrangement to effect the visualization of the optical zoom and digital zoom effects in the viewfinder.

9. A digital camera system according to claim 8, further comprising:

a control program for causing said microprocessor to operate in a predetermined manner in response to said zoom in control signal and said zoom out control signal;

said control program for helping to cause said primary lens arrangement to move along said at least a portion of said primary light path to help effect the capture of the object image with optical zoom effects and for helping to cause said secondary lens arrangement to move along said at least a portion of said common light path to help effect visualization of the object image with optical zoom effects in the viewfinder; and said control program for further helping to cause said secondary lens arrangement to move along said at least another portion of said common light path to help effect visualization of the object image with optical zoom effects and digital zoom effects in the viewfinder.

10. A digital camera system according to claim 9, wherein said control program helps facilitate a combined optical zoom effect and digital zoom effect in a predetermined zoom in order of a 1× optical zoom factor by a 1× digital zoom factor to provide an effective 1× zoom factor, to 2× optical zoom factor by a 2× digital zoom factor to provide an effective 4× zoom factor.

11. A digital camera system according to claim 10 wherein said zoom switch arrangement further includes:

a selection switch for enabling a user to select either a viewfinder mode of zoom operation or a display mode of zoom operation; and wherein said zoom control is further responsive to said selection switch when actuated in said viewfinder mode for causing optical and digital zoom operations with effects viewable in the viewfinder only; and said zoom control responsive to said selection switch when actuated in said display mode for causing optical and digital zoom operations with effects viewable via the viewfinder and the display.

* * * * *